INVENTORS
MICHAEL A. ZINIUK
JACK J. EDWARDS
BY
Ward, Haselton, McElhannon, Brooks & Fitzpatrick
ATTORNEYS

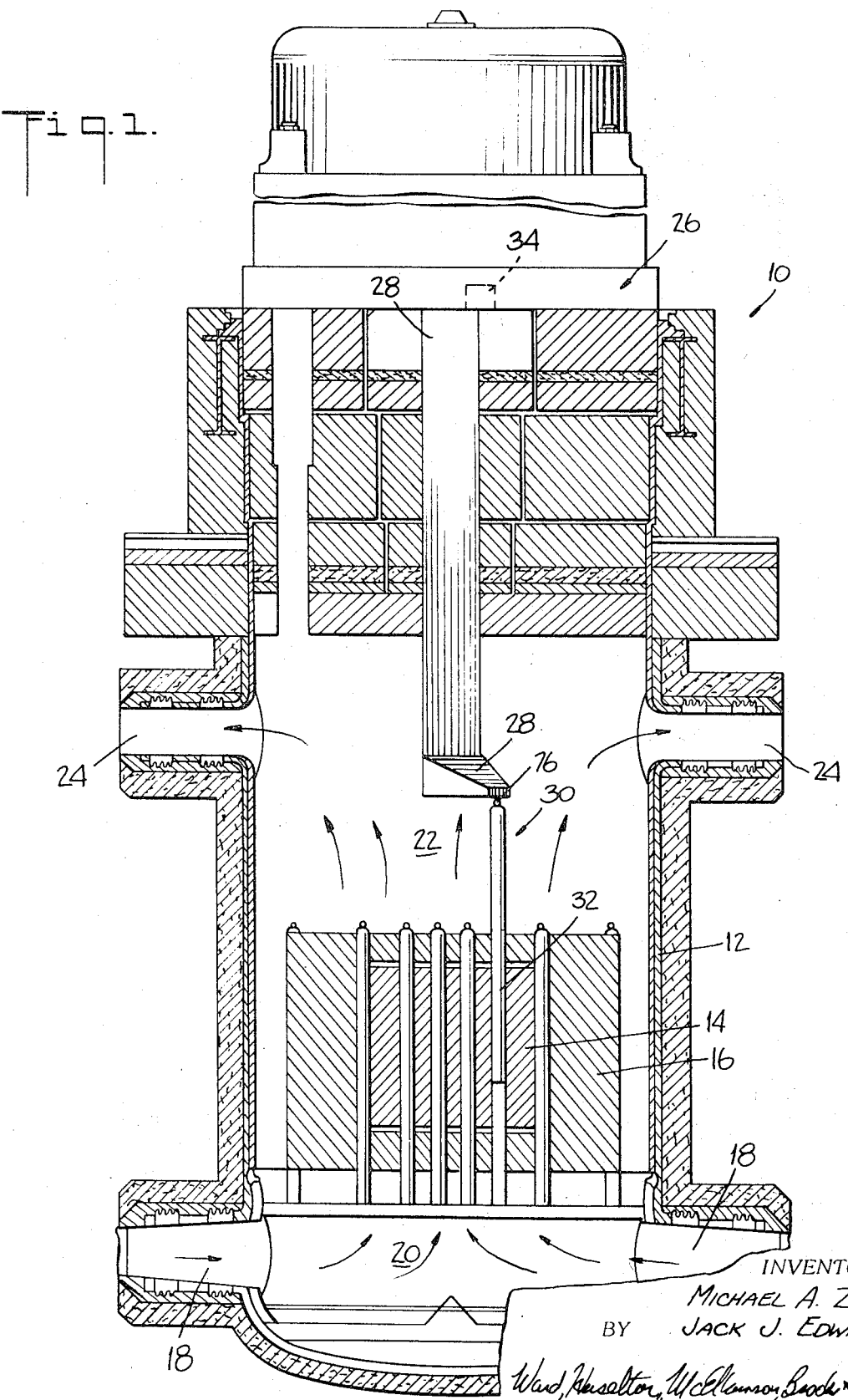

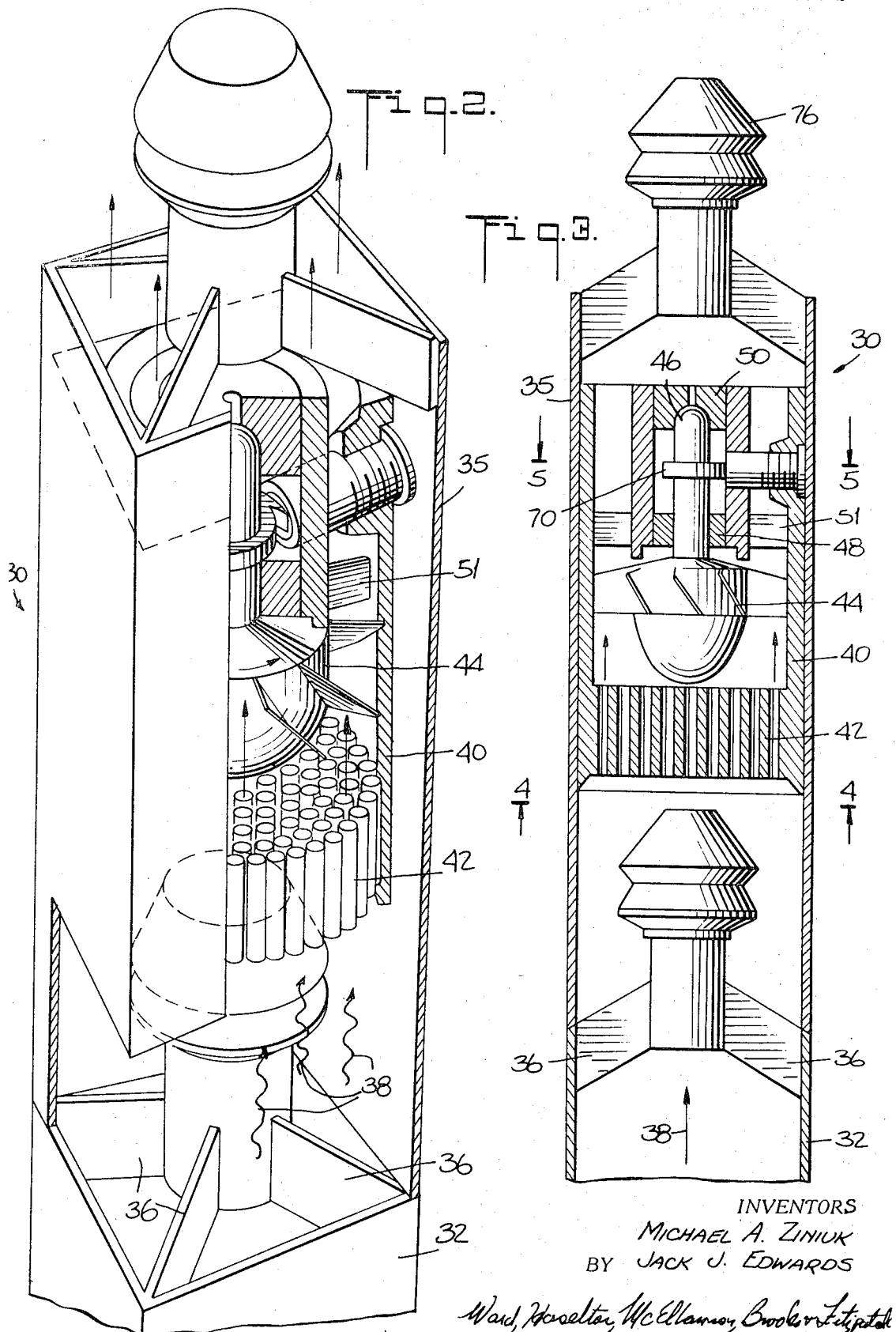

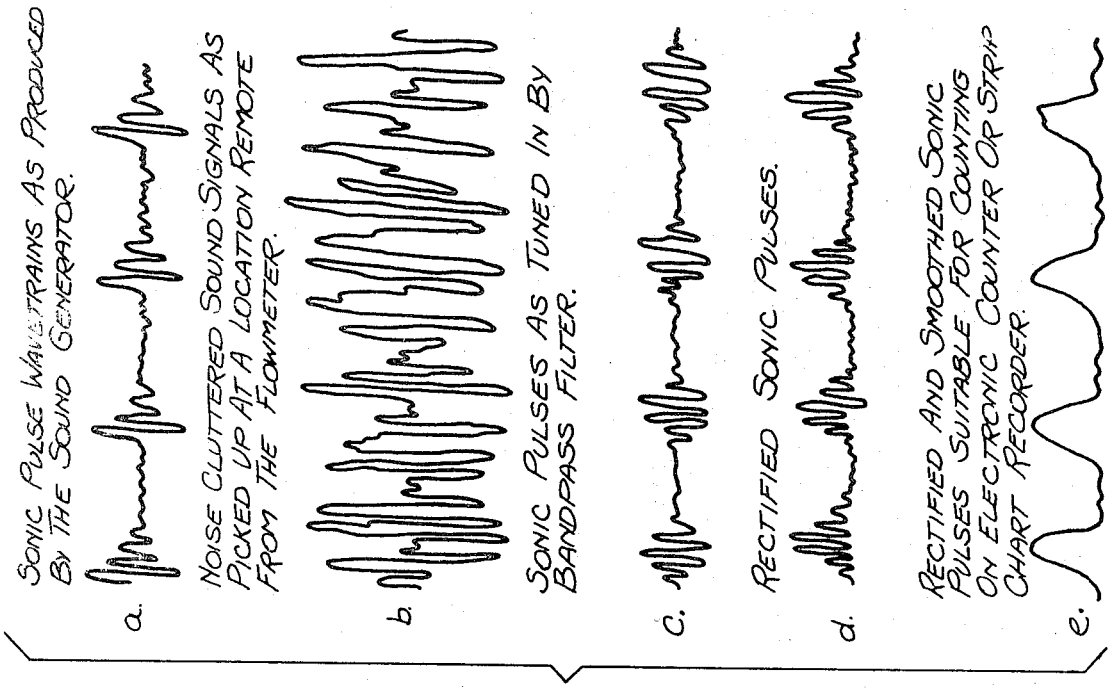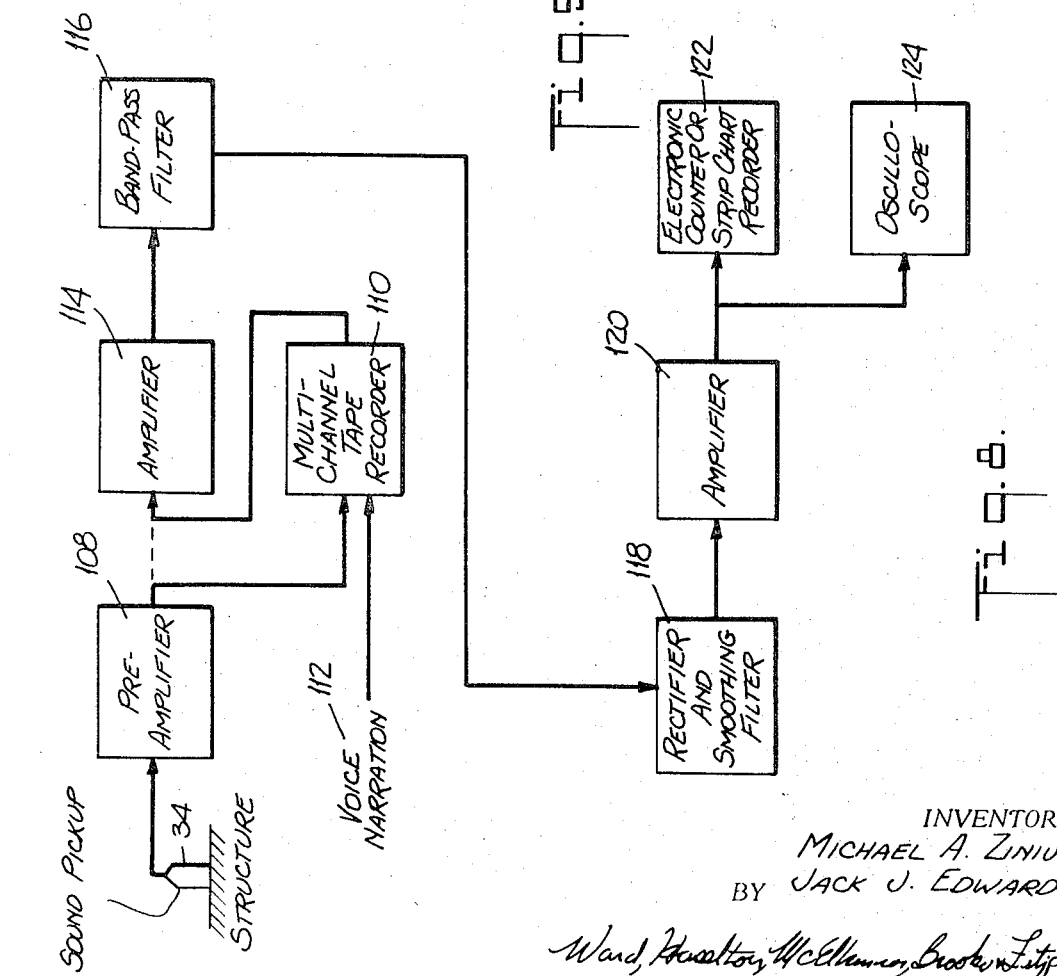

3,564,918
FLOWMETER
Michael A. Ziniuk, Melvindale, and Jack J. Edwards, Southfield, Mich., assignors to Atomic Power Development Associates, Inc., Detroit, Mich., a corporation of New York
Filed Dec. 27, 1967, Ser. No. 693,909
Int. Cl. G01f 1/10
U.S. Cl. 73—231   6 Claims

ABSTRACT OF THE DISCLOSURE

A flowmeter including a turbine wheel driven by the flowing fluid, a sound generator driven by the turbine wheel for transmitting sound waves responsive to the speed of the turbine wheel, and remotely disposed sound pickup apparatus for receiving and counting the sounds emitted from the sound generator.

---

This invention relates to a flowmeter and more particularly to a sonic type flowmeter.

The flowmeter according to this invention is particularly adapted, among other possible uses, for use in the field of liquid metal nuclear reactors for measuring, in position, the flow of coolant through a fuel or blanket subassembly. Measurement of subassembly coolant flow, either periodically or continuously, is useful for detecting incipient blockage of the flow channel. Also, it is desirable to conduct periodic flow surveys during the reactor refueling periods. It will be appreciated that nuclear reactor environmental conditions preclude the use of conventional flow metering devices due to the penetration, shielding and sealing problems created by the lead-out connections.

Briefly, our invention contemplates the provision of a new and improved flowmeter for measuring the flow of fluid in a conduit including a turbine wheel which is rotated by the flow of the fluid itself passing therethrough, the speed of rotation thereof being proportional to the quantity of fluid flow. A sound generator is connected to the turbine wheel for purposes of transmitting sound waves or pulses which are responsive to the speed of rotation of the turbine wheel. These sound waves are picked up by means disposed remotely with respect to the sound generator. This avoids the need of lead-out wiring or other special connections common with other types of flowmeters.

In one form of the invention, the turbine wheel is of the vane-type and is disposed directly in the path of fluid flow. Also, straightening vanes are disposed upstream of the turbine wheel to improve the accuracy of rotation of the turbine wheel with respect to the fluid flow.

One of the features of novelty of the present invention is the provision of a flow device which is housed in a structure similar to a core or blanket subassembly of a nuclear reactor. At the lower end of the structure and on each of the four sides of the wrapper can is a V-contoured edge to seat, engage and seal, in abutting relationship, on the upper end of a subassembly so that the coolant flowing through the subassembly being metered can be channeled upwardly through the flowmeter. At the upper end of the flowmeter structure, in one form of the invention, is a handling head identical to the type mounted on the normal reactor subassembly, whereby handling into and out of the reactor is done entirely by the fuel handling mechanism. The fuel handling mechanism may also provide the sound path between the flowmeter and the sound pickup means, as this enhances efficient sound detection.

According to one embodiment of the invention, the sound generator is a ratchet-type "click" sound producing mechanism which includes a spring-loaded rod and a roller which rides on a single lobed cam forming part of the turbine wheel shaft. This structure provides a simple, reliable and compact sound generating unit. According to another embodiment of our invention, the sound generating means comprises a rotor having an internal cavity and a lower fluid inlet and an upper fluid outlet. A body having a lower fluid inlet is disposed adjacent the upper fluid outlet for intermittently receiving fluid from the roller cavity, the frequency being responsive to the rotational speed of the rotor. A ball is disposed adjacent the fluid inlet in the body, and spring means serve to urge the ball towards engagement with an anvil surface. In operation the rotation of the rotor causes fluid to intermittently enter the fluid inlet and intermittently lift the ball from the anvil surface. The springs serves to return the ball to the anvil surface to thereby produce a "clicking" sound which is received by a sonic pickup means disposed in a remote location with respect to the sound generator.

Pickup of the flowmeter output sound pulses is accomplished, according to our invention, in an external location with respect to the reactor vessel by a sound transducer of a suitable frequency attached to the reactor structure. Detection of the sound on the outside of the reactor vessel is possible by virtue of the high efficiency with which sounds of the audio range and those of ultrasonic frequency are transmitted through steel structures. Inasmuch as the structure provides the signal carrying path, lead-out wires are not required for read-out of the sonic digital flowmeter signals. In one form of the invention, the pickup means are of the piezoelectric type having high sensitivity and moderately high frequency response to 40,000 cycles per second, for example. The output of the sound pickup is fed to a preamplifier disposed near the pickup means. The purpose of the preamplifier is to provide an impedance transformation from the high impedance of the pickup, of the order of millions of ohms, down to several hundred ohms. Reduction of the impedance is desirable to minimize capacitive loading of the pickup by the cable which would otherwise reduce frequency responses of the system. Another purpose of the impedance transformation is the reduction of noise which can be produced by variation of cable capacitance during swaying or vibration of the cable. Preamplifier voltage gain is unity. The output of the preamplifier is fed to an adjustable gain amplifier having a maximum gain of the order of one thousand. The amplifier output is fed either to a filter or to a broad-band tape recorder for playback and data reduction at one's convenience. The bandpass filter is tuned to the sonic pulse frequency. Sonic pulses out of the filter are rectified and smoothed. The resultant D-C pulses are amplified and fed to an electronic counter or to a strip chart recorder for visual recording and counting. An oscilloscope is provided to verify pulse presence and to observe pulse waveform at the input to the electronic counter or the strip chart recorder.

Pulses would be counted for a preselected period of time and the counts per unit of time calculated. In relative flow measurement, the ratio of flow rates between two subassemblies measured would simply be the ratio of counts or the count rate per unit time. Calibration would not be required for accurate relative flow measurement if the flowmeter speed response is linear over the flow range of interest. The flowmeter can be calibrated if absolute flow measurements are to be performed, or if the turbine wheel speed with respect to the flow velocity characteristic is nonlinear.

There has thus been outlined rather broadly the more important features of the invention in order that the detailed description thereof that follows may be better understood and in order that the present contribution to the art may be better appreciated. There are, of course, additional features of the invention that will be described hereinafter which will form the subject of the claims appended hereto. Those skilled in the art will appreciate that the conception on which this disclosure is based may readily be utilized as the basis for the design of other structures for carrying out the several purposes of the invention. It is important, therefore, that the claims be regarded as including such equivalent constructions as do not depart from the spirit and scope of the invention.

Several embodiments of the invention have been chosen for purposes of illustration and description, and are shown in the accompanying drawings, forming a part of the specification, wherein:

FIG. 1 is a vertical, medial, sectional view of a nuclear reactor utilizing a flowmeter constructed according to the concept of this invention;

FIG. 2 is an enlarged perspective view, partially broken away to reveal the flowmeter attached to the top of a subassembly.

FIG. 3 is an enlarged vertical sectional view of the flowmeter attached to the top of the subassembly of FIG. 2;

FIG. 8 is a schematic block diagram of the sound pickup means according to the invention; and FIG. 9 is a series of representative signal waveforms.

Figure 4:
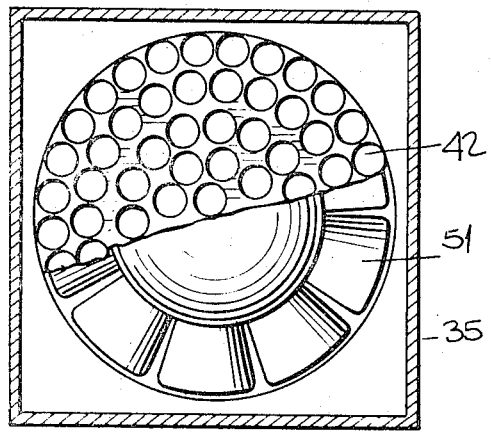
FIG. 4 is an enlarged horizontal sectional view taken along the line 4—4 of FIG. 3.

In the embodiment of the invention illustrated in FIGS. 1–5, a nuclear reactor indicated generally at 10 includes a reactor vessel 12, a core region 14, a blanket region 16, sodium coolant inlets 18, inlet plenum 20, outlet plenum 22, and outlets 24. The top of the reactor is sealed by a plug indicated generally at 26, and a subassembly handling mechanism 28 is adapted to pass through said plug for purposes of positioning the subassemblies in the reactor core and blanket portions. A flowmeter element, indicated generally at 30, is placed on the top of a subassembly 32 and sound pickup means 34 are disposed adjacent the subassembly handling mechanism 28 at a position remotely disposed with respect to the reactor core.

Figure 5:
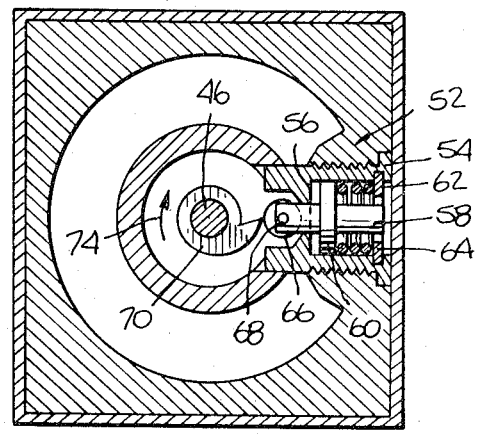
FIG. 5 is an enlarged horizontal sectional view taken along the line 5—5 of FIG. 3.

As best seen in FIGS. 2 and 3, the flowmeter element 30 includes a flowmeter adapter housing 35 which, at the lower end thereof, is provided with V-contoured edges 36 for engaging and forming a butt joint with the upper end of a subassembly 32, whereby the fluid flows upwardly from the subassembly, as indicated by the arrows 38. The medial portion of the flowmeter element 30 contains a flowmeter cartridge 40 which contains flow straightening elements 42 which serve to reduce turbulence and cause the fluid to flow in upwardly directed parallel paths. The flow straightener has a secondary, but highly important, safety function as a strainer which would block the fall of any flowmeter parts into the reactor should failure of the flowmeter rotor assembly occur. The opening size of the flow straightener is small enough to prevent passage of the smallest integral part of the sound producing mechanism. Thereafter, the fluid passes into a vane-type turbine wheel 44. This turbine wheel is mounted on a shaft 46 which, in turn, is mounted in bearings 48 and 50, provided for the purpose. Thence, the fluid passes through stator blades 51. This turbine wheel drives a sound generator or ratchet clicker 52 which, as best seen in FIG. 5, includes a body 54 with an anvil surface 56. The body has a cavity therein for receiving a striker 58, and the striker is provided with a flange 60 for engaging the anvil surface 56. A spring 62 is interposed between the flange 60 and a retainer ring 64, provided for the purpose. The inner end of the striker 58 is provided with a roller 66 and pin 68 for engaging a cam 70 fixedly mounted on shaft 46. The cam 70 is provided with at least one lobe 72 which serves to lift the striker 58 off the anvil surface 56 as the lobe 72 passes the roller 66 in the direction of the arrow 74, FIG. 5. After the lobe has passed the roller, the spring 62 urges the flange 60 into engagement with the anvil surface 56 with sufficient impact to produce a sonic "click." Since the turbine wheel, and hence the shaft 46 rotate at a speed proportional to the volume of fluid flow, the number of "clicks" per unit of time indicates the rate of fluid flow.

Reverting to FIG. 3, the flowmeter element 30 is provided with a self-aligning handling head 76 at the top thereof. This head enables the flowmeter to be readily positioned by means of the reactor subassembly handling mechanism 28 (FIG. 1).

Figure 6:
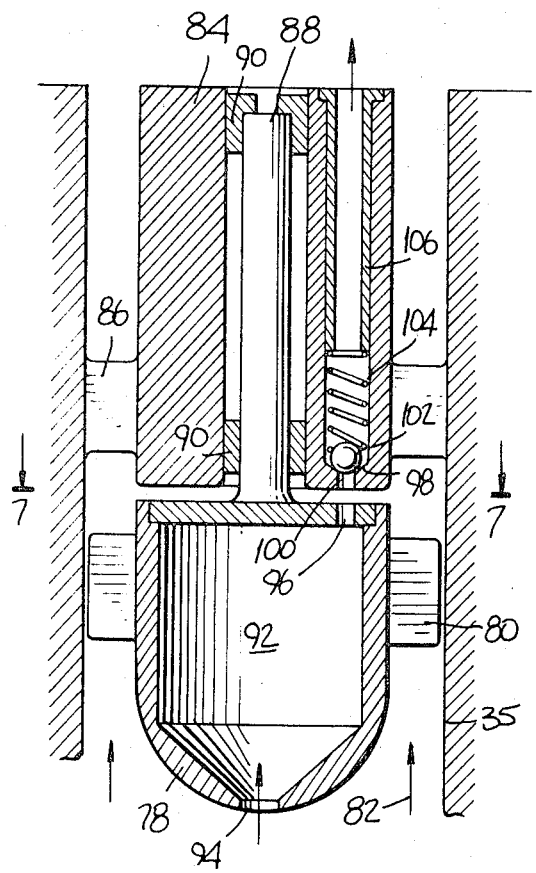
FIG. 6 is an enlarged vertical, medial, sectional view of another form of sound generator.
Figure 7:
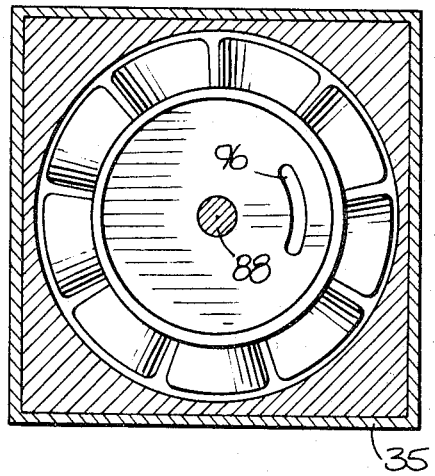
FIG. 7 is a horizontal sectional view taken along the line 7—7 of FIG. 6.

In another form of the invention the sound generator, as illustrated in FIGS. 6 and 7, comprises a rotor 78 mounted within the flowmeter adapter housing 35. This rotor has external vanes 80 which serve to rotate the rotor due to the flow of fluid therethrough in the direction of the arrows 82. The structure also includes a stationary body or element 84, which has stator vanes 86. The rotor 78 is fixedly mounted on shaft 88 which is mounted in bearings 90 carried by the stationary element 84. The rotor 78 has an internal cavity 92 and a lower fluid inlet 94, as well as an upper fluid outlet 96. As is clearly seen in FIG. 7, the upper outlet is disposed towards the periphery of the rotor and extends for a relatively short peripheral distance. Referring to FIG. 6, the stationary body or element 84 has an anvil surface 98 and a lower fluid inlet 100 disposed in the path of travel of the upper fluid outlet 96 of the rotor 78. A ball 102 is disposed adjacent the fluid inlet 100 and a spring 104 is interposed between the ball and a spring retainer 106 for urging the ball against the anvil surface 98. In operation, fluid is discharged from the outlet 96 under pressure, and once each revolution enters the inlet 100, thereby lifting the ball 102 from the anvil 98. As soon as the fluid under pressure ceases to enter the inlet 96, the force of the spring 104 urges the ball downwardly into contact with the anvil surface 98 with sufficient impact to produce a sonic "click." Since the "click" occurs once each revolution (or more depending upon the number of outlets 96) the number of "clicks" per unit of time indicates the rate of fluid flow.

Referring to FIG. 1, sonic pickup means 34 are disposed adjacent the subassembly handling mechanism 28 to pick up the sonic pulses or "clicks" from the internally disposed sound generator. FIG. 9a shows a typical sonic pulse wavetrain as produced by the sound generator, and FIG. 9b shows the noise cluttered sound signals as picked up by the sound pickup means 34, FIG. 8. A preamplifier 108, is connected to the sound pickup means 34. The pulses from the preamplifier may be put on a multichannel tape recorder 110 for playback at one's convenience. Voice narration from a source 112 may be simultaneously recorded for adding information such as a description of the test, the date, equipment calibration settings or identification of the particular subassembly being metered. Then, the pulses are transmitted to an amplifier 114, and from there to a band-pass filter 116. The pulses coming from the band-pass filter appear as illustrated in FIG. 9c. Then, the pulses are passed through a rectifier and smoothing filter 118, FIG. 8, giving them the appearance as seen in FIGS. 9d and 9e. After passing through amplifier 120, the pulses are suitable for counting on an electronic counter or for recording strip chart recorder 122, FIG. 8. The oscilloscope 124 serves to verify the pulse presence and to observe the pulse waveform at the input to the electronic counter or the strip chart recorder.

It will thus be seen that the present invention does indeed provide an improved flowmetering system which is superior in simplicity, economy and efficiency as compared to prior art such devices.

What is claimed and desired to be secured by Letters Patent is:

1. A flowmeter for measuring the flow of fluid in a conduit comprising a rotor driven by the flowing fluid at a speed responsive to the quantity of fluid flow, said rotor having an internal cavity and a lower fluid inlet and an upper fluid outlet, said outlet being disposed at a substantial distance from the rotary axis of said rotor, a body having an anvil surface, said body having a lower fluid inlet disposed in the path of travel of the upper fluid outlet of said rotor for intermittently receiving fluid from said rotor at a frequency responsive to the speed of said rotor, a ball disposed adjacent said last named fluid inlet, spring means urging said ball towards engagement with said anvil surface, whereby rotation of said rotor causes fluid to intermittently enter said last named fluid inlet to intermittently lift said ball from said anvil surface at a frequency responsive to the speed of rotation of said rotor.

2. A flowmeter for measuring the flow of fluid in a conduit according to claim 1 further comprising remotely disposed pickup means for receiving sound waves produced by said ball and anvil and creating corresponding electrical pulses, means for electrically amplifying said pulses, and means for counting and recording said pulses.

3. A flowmeter for measuring the flow of fluid in a conduit according to claim 1 further comprising a remotely disposed sound pickup, a preamplifier connected to said sound pickup, an amplifier connected to said preamplifier, a band-pass filter connected to said amplifier, a rectifier and smoothing filter connected to said band-pass filter, and a second amplifier connected to said rectifier and smoothing filter, and recording and counting means connected to said second amplifier.

4. A flowmeter according to claim 3 further comprising a multichannel tape recorder interconnected between said preamplifier and said first amplifier.

5. Apparatus for use with a liquid metal nuclear reactor for measuring the flow of coolant through a subassembly comprising a flowmeter adapter housing having V-contoured edges at the lower end for engaging and forming a butt joint with the upper end of a subassembly, a flowmeter cartridge mounted in the medial portion of said housing, flow straightening elements mounted in the lower portion of said cartridge for reducing turbulence and causing the fluid to flow upwardly in parallel paths, bearing means mounted in said housing above said flow straightening elements, a vertical shaft carried by said bearing means, a vane-type turbine wheel mounted on said shaft, stator blades mounted in said cartridge above said turbine wheel, said turbine wheel being drivable by the flowing fluid at a speed responsive to the quantity of fluid flow, a cam fixedly mounted on said shaft, a body having an anvil surface, a striker engageable with said anvil surface, and having one end engageable with said cam, spring means urging said striker towards engagement with said anvil surface and remotely disposed sound pickup means for receiving sonic pulses generated by said striker and anvil surface, and a self-aligning head at the top of said housing for moving and apparatus with normal nuclear reactor overhead handling equipment.

6. Apparatus for measuring the flow of fluid in a conduit according to claim 5 wherein said remotely disposed sound pickup means comprises a remotely disposed sound pickup, a preamplifier connected to said sound pickup, an amplifier connected to said preamplifier, a band-pass filter connected to said amplifier, a rectifier and smoothing filter connected to said band-pass filter, and a second amplifier connected to said rectifier and smoothing filter, and counting means connected to said second amplifier.

References Cited

UNITED STATES PATENTS

| | | | |
|---|---|---|---|
| 2,047,529 | 7/1936 | Turk | 73—229UX |
| 2,379,138 | 6/1945 | Fitting, Jr., et al | 73—155 |
| 2,985,829 | 5/1961 | Swift | 73—151X |
| 3,065,416 | 11/1962 | Jeter | 73—506X |
| 3,144,767 | 8/1964 | Testerman et al. | 73—194 |

CHARLES A. RUEHL, Primary Examiner

U.S. Cl. X.R.

73—506